(12) United States Patent  (10) Patent No.: US 7,821,366 B2
Ohashi  (45) Date of Patent: Oct. 26, 2010

(54) MAGNETIC CIRCUIT AND METHOD OF APPLYING MAGNETIC FIELD

(75) Inventor: Ken Ohashi, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 184 days.

(21) Appl. No.: 11/889,165

(22) Filed: Aug. 9, 2007

(65) Prior Publication Data

US 2008/0074783 A1    Mar. 27, 2008

(30) Foreign Application Priority Data

Aug. 10, 2006    (JP)    ............................. 2006-217814

(51) Int. Cl.
*H01F 7/02*    (2006.01)
*G11B 5/66*    (2006.01)
(52) U.S. Cl. ...................................... 335/306; 428/827
(58) Field of Classification Search ................ 335/306, 335/284; 428/828, 831
See application file for complete search history.

(56) References Cited

U.S. PATENT DOCUMENTS

| | | | | |
|---|---|---|---|---|
| 3,168,686 | A * | 2/1965 | King et al. | 335/306 |
| 5,107,238 | A * | 4/1992 | Leupold | 335/306 |
| 5,126,713 | A * | 6/1992 | Leupold | 335/304 |
| 5,512,872 | A * | 4/1996 | Ohashi | 335/306 |
| 5,628,047 | A * | 5/1997 | Hiroyoshi | 419/62 |
| 5,781,843 | A * | 7/1998 | Anderson et al. | 419/29 |
| 5,815,342 | A * | 9/1998 | Akiyama et al. | 360/97.01 |
| 6,828,890 | B2 * | 12/2004 | Cope et al. | 335/296 |
| 6,876,284 | B2 * | 4/2005 | Wright et al. | 335/229 |
| 6,881,495 | B2 * | 4/2005 | Kikitsu et al. | 428/827 |
| 6,943,464 | B2 * | 9/2005 | Hol et al. | 310/12.05 |
| 7,148,777 | B2 * | 12/2006 | Chell et al. | 335/306 |
| 7,148,778 | B2 * | 12/2006 | Humphries et al. | 335/306 |
| 7,352,268 | B2 * | 4/2008 | Wright et al. | 335/229 |

(Continued)

FOREIGN PATENT DOCUMENTS

JP    S62-033337    2/1987

(Continued)

OTHER PUBLICATIONS

Japanese Notice of Reasons for Rejection dated Nov. 27, 2009 from corresponding Japanese Patent Application No. 2006-217814, and an English language translation of a section thereof, 4 pgs.

*Primary Examiner*—Elvin G Enad
*Assistant Examiner*—Alexander Talpalatskiy
(74) *Attorney, Agent, or Firm*—Finnegan, Henderson, Farabow, Garrett & Dunner LLP

(57) ABSTRACT

In a magnetic circuit for providing magnetic anisotropy in the in-plane radial direction of a soft magnetic under layer, magnets for perpendicular magnetization are respectively provide on the north and south poles of a magnet for horizontal magnetization. When magnetic circuits configured thus are stacked in a plurality of stages, a magnetic field (air-gap magnetic field) formed in a gap between the magnetic circuits is superimposed by magnetic fields from the magnets for perpendicular magnetization as well as a magnetic field from the magnet for horizontal magnetization (in-plane magnetization). The pole faces of the magnets for perpendicular magnetization are disposed closer to the gap between the magnetic circuits, so that a stronger magnetic field can be formed in the gap.

4 Claims, 8 Drawing Sheets

U.S. PATENT DOCUMENTS

| | | | |
|---|---|---|---|
| 2003/0057791 A1* | 3/2003 | Post | 310/191 |
| 2003/0102723 A1* | 6/2003 | Korenaga | 310/12 |
| 2003/0112105 A1* | 6/2003 | Post | 335/285 |
| 2003/0127317 A1* | 7/2003 | Cope et al. | 204/164 |
| 2005/0168311 A1* | 8/2005 | Wright et al. | 335/306 |
| 2006/0082035 A1 | 4/2006 | Sugiyama et al. | |

FOREIGN PATENT DOCUMENTS

| | | |
|---|---|---|
| JP | 5-143972 | 6/1993 |
| JP | 2005-143972 | 6/1993 |
| JP | 2003-272143 | 9/2003 |
| JP | 2005-209326 | 8/2005 |
| WO | WO 2004/077413 | 9/2004 |

* cited by examiner

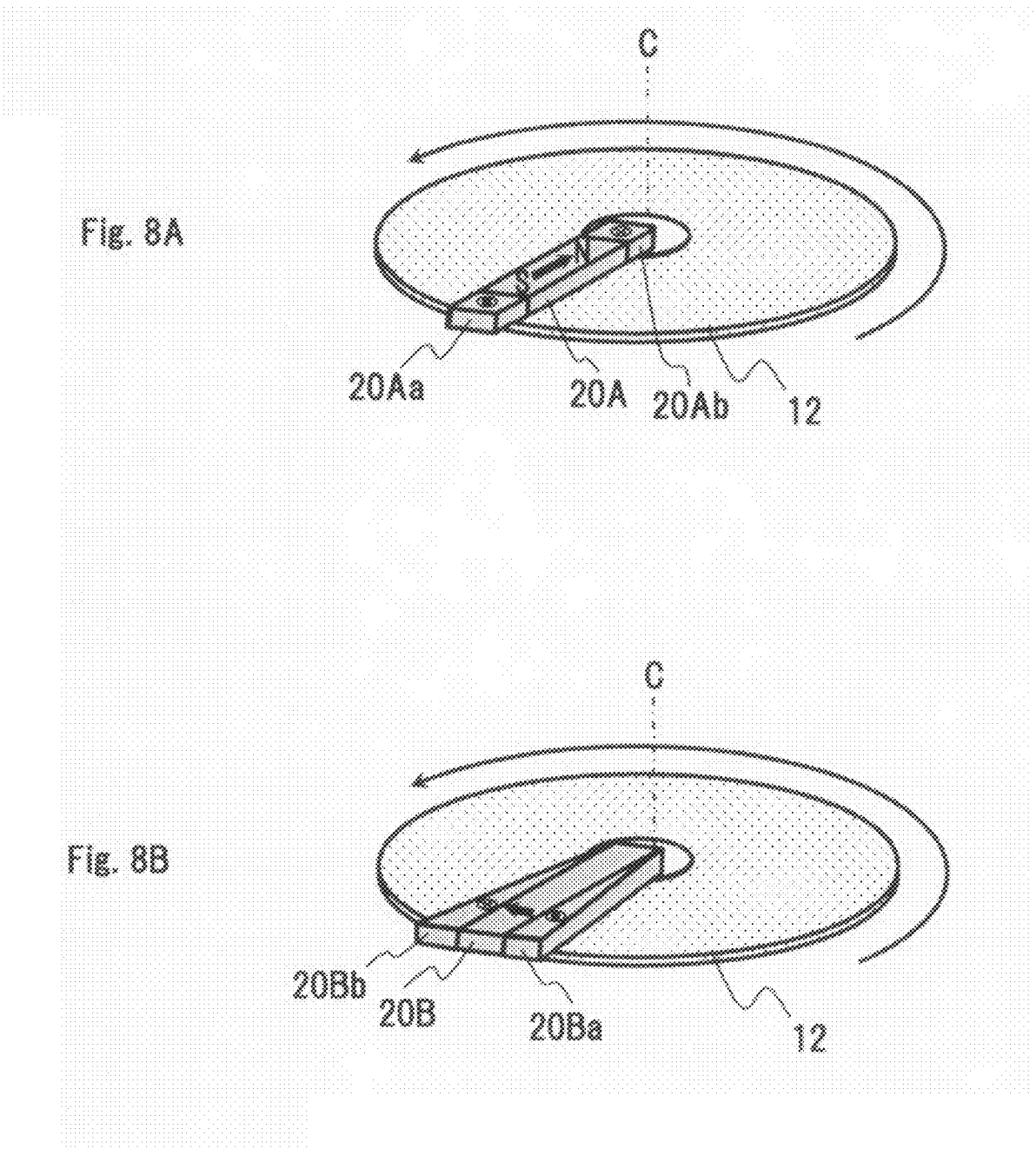

MAGNETIC CIRCUIT AND METHOD OF APPLYING MAGNETIC FIELD

BACKGROUND OF THE INVENTION

1. Field of the Invention

The present invention relates to a magnetic circuit and, more particularly, the present invention relates to a magnetic circuit suitably used for magnetic field heat treatment of a magnetic recording medium substrate and so on and a method of applying a magnetic field by means of the magnetic circuit.

2. Description of the Related Art

In the technical field of information recording, hard disk drives acting as means for magnetically reading and writing information including characters, images, and music have become necessary as primary external recorders or internal recording means of electronic equipment such as personal computers. Such hard disk drives include hard disks serving as magnetic recording media. For hard disks, a so-called "in-plane magnetic recording method (longitudinal magnetic recording method)" is available in which magnetic information is longitudinally written in the plane of a disk and "a perpendicular magnetic recording method" is available in which magnetic information is perpendicularly written in the plane of a disk.

FIG. 1 is a sectional view schematically showing a typical laminated structure of a hard disk of the longitudinal magnetic recording method. A non-magnetic Cr base layer 2 formed by a sputtering method, a magnetic recording layer 3, and a carbon layer 4 serving as a protective film are sequentially stacked on a non-magnetic substrate 1, and a liquid lubricating layer 5 formed by applying a lubricant is formed on a surface of the carbon layer 4. The layers are about 20 nm in thickness at the most and are generally formed by a dry process such as a magnetron sputtering method (for example, see Japanese Patent Laid-Open No. 5-143972). The magnetic recording layer 3 is made of a Co alloy having uniaxial crystal magnetic anisotropy. The Co alloy includes CoCrTa and CoCrPt alloys. The crystal grains of the Co alloy are horizontally magnetized relative to a surface of the disk to record information.

However, in the longitudinal magnetic recording method, an increase in recording density has been regarded as being limited because of the following problems: when each recording region (magnetic domain) is reduced in size to increase a recording density, the north poles and south poles of adjacent magnetic domains repel each other and result in cancellation of magnetization, so that for a high recording density, it is necessary to reduce the thickness of the magnetic recording layer and reduce the crystal grains in size, and finer crystal grains (smaller volumes) cause a phenomenon such as "thermal fluctuations" in which the magnetization direction of the crystal grains is disturbed by thermal energy and data is deleted.

In response to these problems, the "perpendicular magnetic recording method" has been studied. In this recording method, a magnetic recording layer is magnetized perpendicularly to a surface of a disk. Thus the north poles and the south poles are alternately combined and placed in a bit arrangement and the north poles and south poles of magnetic domains are adjacent to each other with enhanced magnetization. As a result, there is just a small number of self-demagnetizing fields (demagnetizing fields) in a bit and thus the magnetization (magnetic recording) is more stabilized. When the magnetization direction is recorded in the perpendicular direction, it is not necessary to significantly reduce the thickness of the magnetic recording layer. For this reason, even when the recording region is reduced in size in the horizontal direction, the recording layer is increased in thickness and the crystal grains are increased in size in the perpendicular direction, so that the overall crystal grains are increased in volume and the influence of "thermal fluctuations" can be reduced. Thus the perpendicular magnetic recording method is expected as a method for achieving super high density recording.

FIG. 2 is a sectional view schematically showing a basic layered structure of a hard disk acting as a "perpendicular two-layer magnetic recording medium" in which a recording layer for perpendicular magnetic recording is provided on a soft magnetic under layer (SUL). A soft magnetic under layer (SUL) 12, a magnetic recording layer 13, a protective layer 14, and a lubricating layer 15 are sequentially stacked on a non-magnetic substrate 11.

In this structure, the soft magnetic under layer 12 effectively acts to increase a writing magnetic field and reduce the demagnetizing field of the magnetic recording layer 13. Permalloy, CoZrNb amorphous, and so on are typically used for the soft magnetic under layer 12. For the magnetic recording layer 13, a CoCrPt alloy, a PtCo film, a PtFe film, or a SmCo amorphous film or the like is used.

As shown in FIG. 2, in a hard disk of the perpendicular two-layer magnetic recording method, the soft magnetic under layer 12 is provided as the base of the magnetic recording layer 13. The soft magnetic under layer 12 has a magnetic property of "soft magnetism" and has a thickness of about 100 nm to 500 nm. The soft magnetic under layer 12 is provided to increase a writing magnetic field and reduce the demagnetizing field of the magnetic recording film. Further, the soft magnetic under layer 12 acts as a path of a magnetic flux from the magnetic recording layer 13 and a path of a writing magnetic flux from a recording head. In other words, the soft magnetic under layer 12 plays the same role as an iron yoke provided in a permanent magnet magnetic circuit. Thus in order to avoid magnetic saturation during writing, the thickness of the soft magnetic under layer 12 has to be set larger than that of the magnetic recording layer 13.

In view of the multilayer configuration, the soft magnetic under layer 12 corresponds to the non-magnetic Cr base layer 2 provided in the hard disk of the longitudinal magnetic recording method shown in FIG. 1. However, the soft magnetic under layer 12 is not formed as easily as the Cr base layer 2.

As described above, in the hard disk of the longitudinal magnetic recording method, each layer is about 20 nm in thickness at the most and is formed by a dry process (mainly by magnetron sputtering, see Japanese Patent Laid-Open No. 5-143972). Also for perpendicular two-layer recording media, various methods have been studied to form the magnetic recording layer 13 and the soft magnetic under layer 12 by a dry process.

However, when the soft magnetic under layer 12 is formed by the dry process, a sputtering target has to be a ferromagnetic material having strong saturation magnetization and the soft magnetic under layer 12 has to be 100 nm or larger in thickness. For these reasons, perpendicular two-layer recording media have serious problems about mass production and productivity in consideration of the evenness of the film thickness and composition, the life of the target, the stability of the process, and the low deposition rate above all.

For this reason, attempts to apply a metal film on the non-magnetic substrate 11 by a plating method and use the metal film as the soft magnetic under layer 12 have been studied. In the plating method, the thickness of the metal film can be easily increased and can be polished.

FIG. 3 is an explanatory drawing showing a structural example of a perpendicular two-layer recording medium in which the soft magnetic under layer 12 is formed by plating. In this laminated structure, between the non-magnetic substrate 11 and the soft magnetic under layer 12, a nucleation film 16 for obtaining adhesion to the substrate is formed by plating.

Incidentally, a number of magnetic domains magnetized in a specific direction are prone to appear in the plane of a soft magnetic film and domain walls appear on the interfaces of the magnetic domains. When the soft magnetic film having such domain walls is used as a soft magnetic under layer for the perpendicular two-layer magnetic recording medium, a leakage magnetic field generated from the domain walls causes isolated pulse noise called spike noise or micro-spike noise, so that the signal reproduction property may be seriously deteriorated. As a solution to this problem, it is effective to make the soft magnetic film anisotropic in the in-plane radial direction serving as the easy axis of magnetization or in the in-plane circumferential direction.

FIG. 4 is an explanatory drawing of "magnetic anisotropy". An anisotropic magnetic field ($H_k$) is provided as a difference ($\delta H$) between a magnetization saturation magnetic field strength in the in-plane radial direction and a magnetization saturation magnetic field strength in the in-plane circumferential direction. When $\delta H$ is positive, the in-plane radial direction is the magnetization direction (anisotropy direction). When $\delta H$ is negative, the in-plane circumferential direction is the magnetization direction (anisotropy direction). In this case, the numeric value of magnetic anisotropy is represented as an absolute value.

When the soft magnetic film is formed by a dry process (for example, a sputtering method), the soft magnetic film is provided with magnetic anisotropy in the in-plane radial direction by applying a radial magnetic field to the substrate during sputtering. When the soft magnetic film is formed by a wet process (for example, a plating method), the soft magnetic film can be provided with magnetic anisotropy in the in-plane circumferential direction by forming the soft magnetic film while applying a magnetic field in one direction to the substrate and rotating the substrate during plating. Such magnetic anisotropy is substantially axially symmetric with respect to the axis of the substrate and may be provided in either of the in-plane radial and circumferential directions according to the simulation results of a magnetic recording process.

However, in both of the dry and wet processes, it is not easy to simultaneously form a soft magnetic film with excellent film characteristics and provide the film with magnetic anisotropy having high axial symmetry. Thus a method for simultaneously achieving such excellent film characteristics and magnetic anisotropy is desired.

As an effective means of providing magnetic anisotropy, a technique of heat-treating a soft magnetic substance in a magnetic field is available. For example, in a fabrication process of a GMR head, heat treatment is performed in a strong magnetic field exceeding 1 tesla (T) to orient a pin layer and a free layer, so that magnetic anisotropy is provided in the direction of the magnetic field.

Further, it is known that in an audio-visual magnetic head, noise can be reduced by performing heat treatment in a rotating magnetic field (one of a magnetic field device and the head is rotated) to obtain magnetic isotropy.

However, in such a heat treatment process, it is necessary to form a heat treatment furnace including a non-magnetic component and generate a magnetic field in one direction in the heat treatment furnace. Thus a magnetic field generator tends to be large in size and require external installation and the heat treatment furnace tends to have a complicated configuration.

It can be said that a magnetic field heat treatment method for providing a soft magnetic substance with magnetic anisotropy or isotropy is an established technique. However, it is not easy to provide the soft magnetic under layer of the perpendicular two-layer recording medium with axially symmetric magnetic anisotropy in the in-plane radial direction and the in-plane circumferential direction through magnetic field heat treatment. This is because in the configuration for applying a magnetic field from the outside of the heat treatment furnace, it is difficult to form a magnetic field in the in-plane radial direction or the in-plane circumferential direction of the substrate disposed in the furnace.

A magnetic field in the in-plane radial direction can be relatively easily formed with coils having the same poles facing each other. However, a region enabling a diverging magnetic field in the in-plane radial direction suitably for obtaining magnetic anisotropy is small. Further, a strong magnetic field is hard to obtain.

Under these constraints, soft magnetic under layers have not been provided with axially symmetric magnetic anisotropy through magnetic field heat treatment.

SUMMARY OF THE INVENTION

The present invention is designed in view of these problems. An object of the present invention is to provide a permanent magnet magnetic circuit which is suitable for providing a soft magnetic substance (particularly, a soft magnetic under layer (SUL film) for a perpendicular two-layer magnetic recording medium) with axially symmetric magnetic anisotropy through magnetic field heat treatment and is capable of generating a stronger magnetic field, and provide a method of applying a magnetic field by using the permanent magnet magnetic circuit.

In order to solve the above problems, a magnetic circuit of the present invention for storing a sample in a gap formed between a plurality of magnetic field application parts opposed to each other in parallel and applying a magnetic field to the sample, wherein each of the magnetic field application parts is configured by combining a plurality of permanent magnet segments, the permanent magnet segments include a first permanent magnet horizontally magnetized in parallel with the opposed surface of the magnet field application part, a second permanent magnet magnetized perpendicularly to the opposed surface of the magnetic field application part, the second permanent magnet being provided on the north pole of the first permanent magnet, and a third permanent magnet perpendicularly magnetized in the opposite direction from the second magnet, the third permanent magnet being provided on the south pole of the first permanent magnet.

Preferably, the magnetic field application parts are configured like a ring around the virtual axis with a combination of the plurality of first to third permanent magnets, the first permanent magnet is disposed such that the first permanent magnet is magnetized in a direction to the virtual axis or perpendicularly to the direction to the virtual axis.

When the first permanent magnet is disposed such that the first permanent magnet is magnetized perpendicularly to the direction to the virtual axis, the first permanent magnet is preferably magnetized in a direction different from the magnetization direction of another first permanent magnet by about 90°.

In the magnetic circuit of the present invention, the magnet is, for example, a 2-17 SmCo magnet having a coercive force of at least 20 kOe and the gap is, for example, 50 mm to 100 mm.

A method of applying a magnetic field according to the present invention by using the magnetic circuit of the present invention, the method including the steps of: storing a disk-like sample in the gap of the magnetic circuit; providing the disk-like sample and the magnetic circuit with a relative rotational speed in a state in which the axis of the disk-like sample is aligned with the virtual axis of the magnetic circuit; and applying a magnetic field in one of the in-plane circumferential direction and the in-plane radial direction over the disk-like sample.

According to the present invention, in addition to a side of the magnetic field application part (the pole side of the magnet), the magnets having pole faces on the magnet gap surfaces are used for applying a magnetic field. Thus it is possible to form a strong magnetic field in a gap between the magnetic field application parts (magnets), thereby effectively performing magnetic field thermal treatment on the magnetic sample.

Therefore, according to the magnetic circuit of the present invention, it is possible to set a large gap and increase the number of magnetic samples treatable in magnetic field thermal treatment at a time, so that a compact magnetic circuit can be designed.

BRIEF DESCRIPTION OF THE DRAWINGS

Other objects, features and advantages of the present invention will become more apparent from the following detail description when read in conjunction with the accompanying drawings in which:

FIGS. 8A and 8B are explanatory drawings of structural examples of a magnetic circuit made by the present inventors (FIG. 8A: a radial magnetic field, FIG. 8B: a circumferential magnet circuit);

FIG. 9A is a top view of the magnetic circuit;

FIG. 9B is a sectional view taken along line b-b' of FIG. 9A;

FIG. 10A is a top view of the magnetic circuit; and

FIG. 10B is a sectional view taken along line b-b' of FIG. 10A.

DESCRIPTION OF THE PREFERRED EMBODIMENTS

Exemplary embodiments for implementing the present invention will be specifically described below with reference to the accompanying drawings.

The present inventors have devoted themselves to conduct studies on a method of generating a magnetic field and have invented a permanent magnetic circuit of the present invention by combining a plurality of permanent magnets in different magnetization directions. The permanent magnet magnetic circuit can generate a stronger magnetic field than a conventional magnetic circuit at high temperatures. Further, the present inventors have also invented a method of applying a magnetic field by using the permanent magnetic circuit in a heat treatment furnace such that the magnetic field is substantially axially symmetric with respect to a magnetic substance to be treated.

First, the following will describe how the inventors have reached the present invention.

Sintered rare earth permanent magnets are generally anisotropic sintered magnets which are molded and sintered with C axes aligned in magnetic fields.

Figure 1:
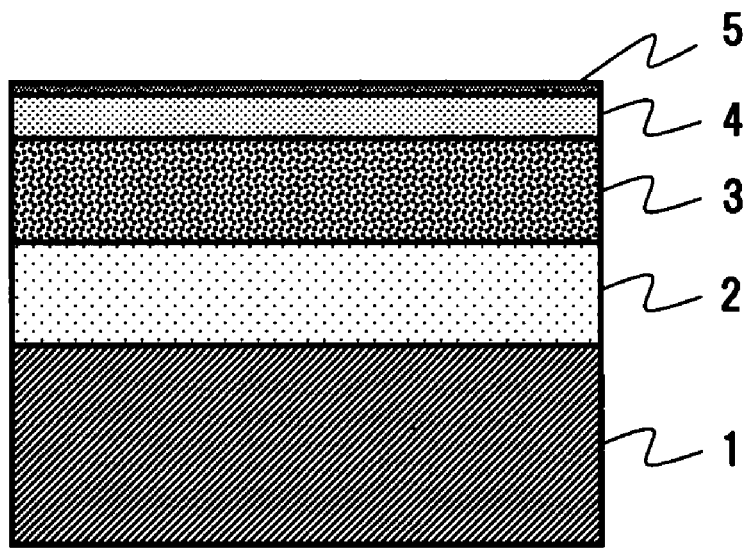
FIG. 1 is a sectional view schematically showing a typical laminated structure of a hard disk of a longitudinal magnetic recording method.
Figure 2:
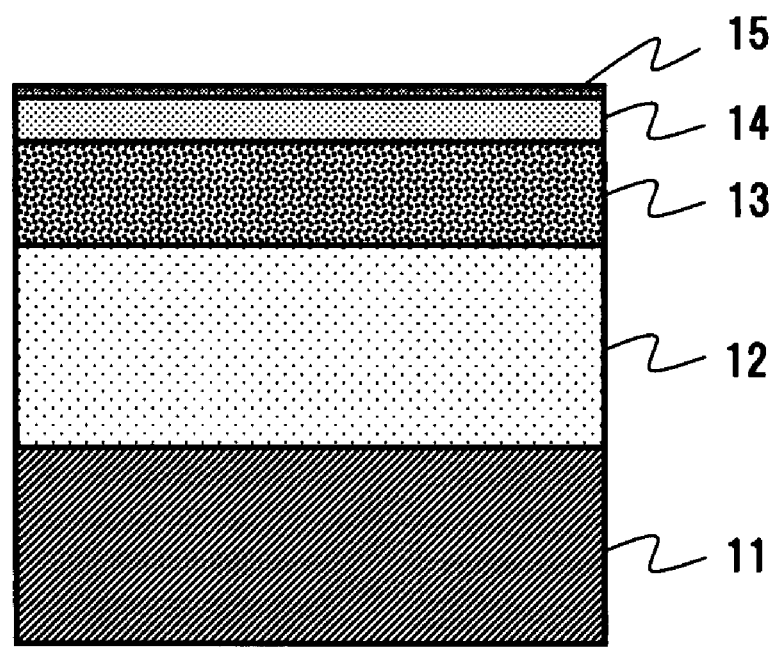
FIG. 2 is sectional view schematically showing a basic layered structure of a hard disk acting as a perpendicular two-layer magnetic recording medium.
Figure 3:
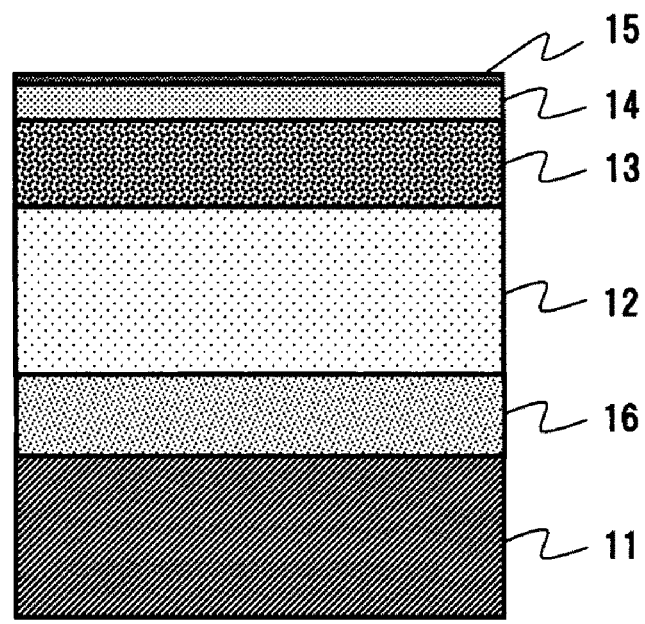
FIG. 3 is an explanatory drawing showing a structural example of a perpendicular two-layer recording medium in which a soft magnetic under layer is formed by plating.
Figure 4:
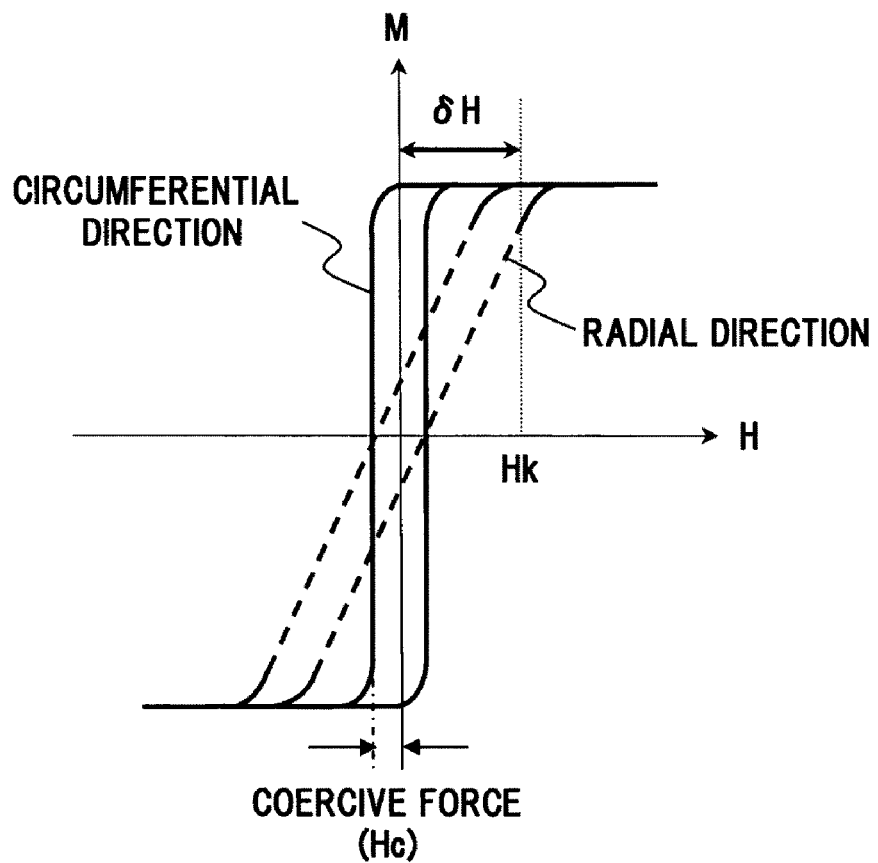
FIG. 4 is an explanatory drawing of "magnetic anisotropy"
Figure 5A:
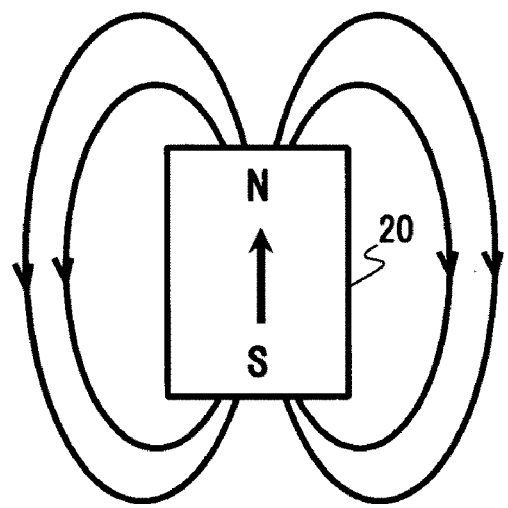
FIGS. 5A, 5B, and 5C are schematic diagrams showing the states of the magnetic fields of anisotropic magnets.
Figure 5B:
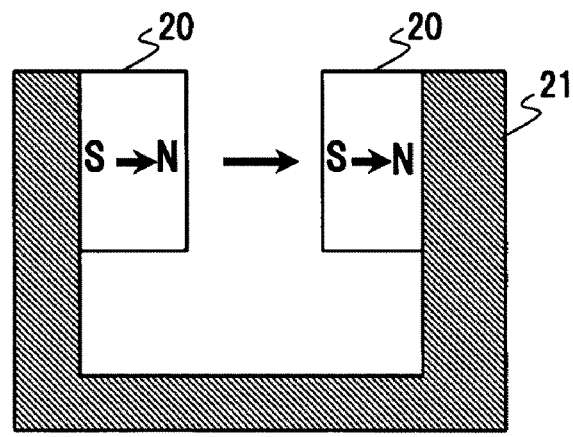
Figure 5C:
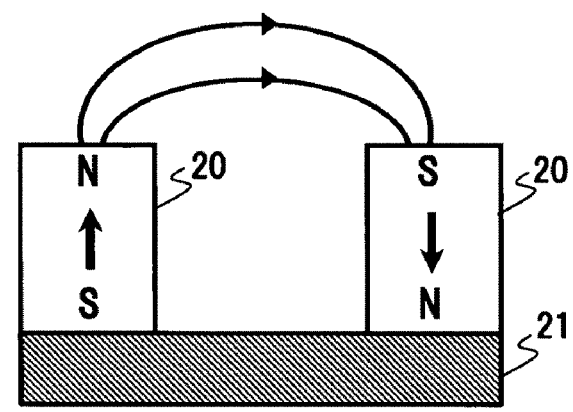

FIGS. 5A, 5B and 5C are schematic diagrams showing the states of the magnetic fields of such anisotropic magnets. As shown in FIG. 5A, a magnetic flux emerges from the north pole face of a magnet 20 and enters the south pole face of the magnet 20. The north and south poles are always paired (dipole moment) and the amount of the emerging magnetic flux and the amount of the entering magnetic flux are balanced with each other. Unlike electric charge, magnetic charge cannot be separately drawn out. Thus a magnetic field distribution (including a direction) realized by permanent magnets is restricted. It is relatively easy to generate a magnetic field in one direction facing a pole face through a yoke 21 which is a magnetic substance (FIG. 5B) and it is also easy to generate a curved magnetic field distribution between poles (FIG. 5C).

On the other hand, it is difficult to realize a magnetic field distribution including a radial magnetic field radiating in one plane and a circumferential magnetic field generated like a ring.

Figure 6A:
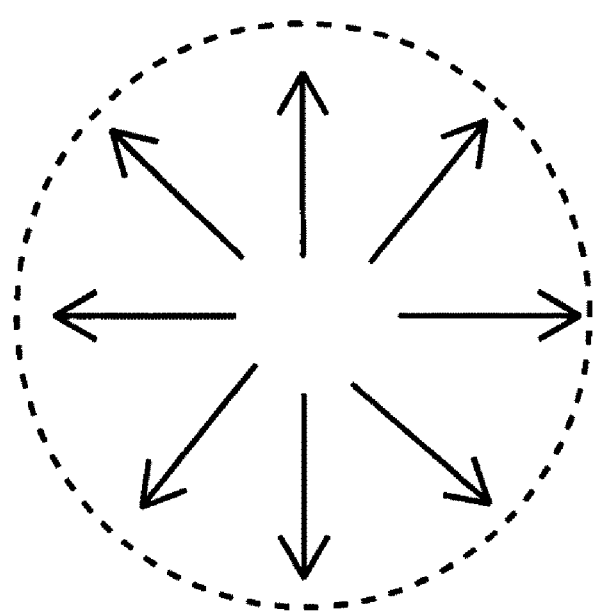
FIGS. 6A and 6B are explanatory drawings of the states of magnetic fluxes of a radial magnetic field (FIG. 6A) and a circumferential magnetic field (FIG. 6B)
Figure 6B:
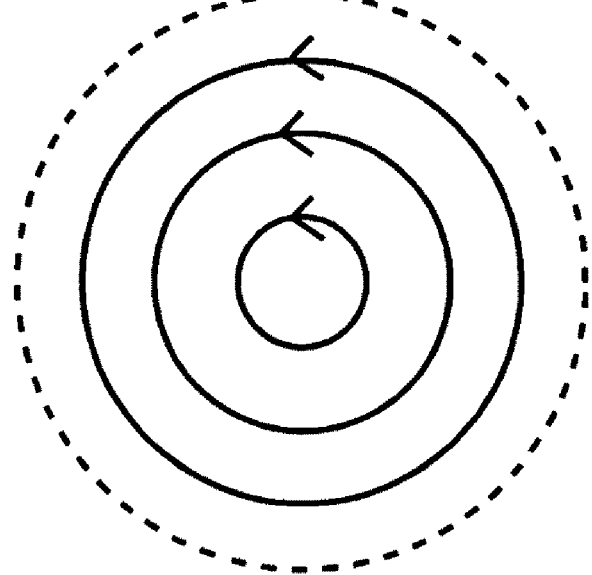

FIGS. 6A and 6B are explanatory drawings showing the states of the magnetic fluxes of the radial and circumferential magnetic fields. The radial magnetic field (FIG. 6A) is difficult to form because it is difficult to balance the amounts of magnetic charge on the inner side and the outer side. Further, the circumferential magnetic field (FIG. 6B) is difficult to form because even in the presence of anisotropy in the circumferential direction of a ring-shaped magnet, the flow of a magnetic flux is basically closed in the magnet and hardly leaks out of the magnet due to the absence of an exit of the magnetic flux.

The present inventors mounted permanent magnet magnetic circuits in a heat treatment furnace and performed magnetic field heat treatment in a state in which the magnetic circuits and an object to be treated are set at the same temperature.

Figure 7A:
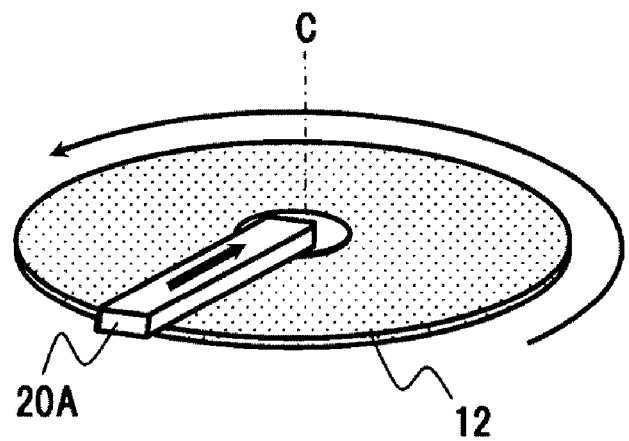
FIGS. 7A and 7B are explanatory drawings of structural examples of a magnetic circuit made by the present inventors (FIG. 7A: a radial magnetic field, FIG. 7B: a circumferential magnet circuit)
Figure 7B:
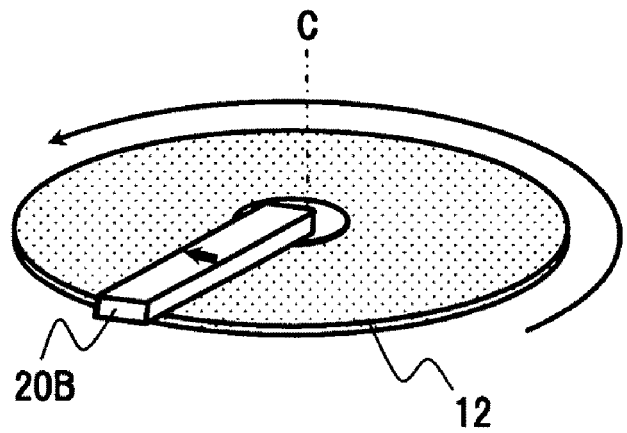

FIGS. 7A and 7B are explanatory drawings showing structural examples of a magnetic circuit having been studied in these attempts. In FIGS. 7A and 7B, reference numerals 20A and 20B denote magnetic field application parts, each being made up of a relatively small permanent magnet magnetic circuit. The magnetization directions (that is, the magnetic field directions) are indicated by arrows.

The magnetic field application part 20A shown in FIG. 7A generates a magnetic field in the radial direction of a soft magnetic under layer 12 on a non-magnetic substrate. The soft magnetic under layer 12 rotates about an axis (C) of the substrate, so that the magnetic field is applied over the substrate in terms of time average. The magnetic field application part 20B shown in FIG. 7B generates a magnetic field in the circumferential direction of a soft magnetic under layer 12. The soft magnetic under layer 12 rotates about an axis (C) of the substrate, so that the magnetic field is similarly applied over the substrate in terms of time average.

When a magnetic field is applied, as shown in FIG. 7A, using the magnetic field application part 20A for generating a magnetic field in the radial direction of the soft magnetic under layer 12, magnetic anisotropy is provided for the magnetization curve of the radial direction in the plane of the substrate. When a magnetic field is applied, as shown in FIG. 7B, using the magnetic field application part 20B for generating a magnetic field in the circumferential direction of the soft magnetic under layer 12, magnetic anisotropy is provided for the magnetization curve of the circumferential direction in the plane of the substrate.

Through these studies, the present inventors confirmed that axially symmetric magnetic anisotropy can be provided for a magnetic substance by rotating the magnetic substance while applying a magnetic field to a part or the whole of the magnetic substance serving as an object to be treated.

For example, in the magnetic circuit in FIG. 7A or FIG. 7B, between the magnet serving as the magnetic field application part (20A, 20B) and the soft magnetic under layer 12 serving as an object to be treated, a magnetic field can be generated substantially in the opposite direction from the magnetization direction of the magnet. Assuming that the magnet is a rare-earth magnet, a magnetic flux leaking from a side of the magnet is almost negligible. Thus the direction and strength of an air-gap magnetic flux can be easily controlled.

Further, the directions of the application of a magnetic field to the object to be treated can be selected by switching the two kinds of magnetic circuit shown in FIGS. 7A and 7B. For example, in the case of a circular object to be treated as shown in FIGS. 7A and 7B, the magnetic field application part 20A of FIG. 7A can generate a magnetic field in the in-plane radial direction and the magnetic field application part 20B of FIG. 7B can generate a magnetic field in the in-plane circumferential direction. Further, when a magnetic field is to be applied in the intermediate direction of the in-plane radial direction and the in-plane circumferential direction, the magnetization direction of the magnet (20A, 20B) is preferably set in the intermediate direction.

Particularly, by stacking these magnetic circuits in a plurality of stages and inserting a plurality of objects to be treated into gaps between the magnetic circuits to treat the objects in a collective manner, magnetic anisotropy can be provided for a plurality of magnetic substances through one treatment at a time.

However, as a result of the studies, the inventors concluded that in the magnetic circuits configured thus, even if a rare-earth magnet is used for the magnetic application part, it is difficult to sufficiently increase the strength of a magnetic field in the gap area. This is because the magnetic field is generated in the gap orthogonal to the pole face of the magnet.

The magnetic field strength of the order of kilogauss (kG) can be easily obtained by setting a relatively narrow gap (e.g., not larger than 30 mm) between the magnetic field application parts (magnets). However, in view of practical use, it is desired to generate a magnetic field with a controlled direction and strength in a wider gap area (e.g., about 100 mm) and treat a number of samples at the same time. Thus, in view of practical use, it is difficult to obtain a sufficient magnetic field strength in the magnetic circuits configured as shown in FIGS. 7A and 7B.

The inventors conducted studies to enable more effective magnetic field heat treatment by increasing the strength of a magnetic field generated in a gap between magnetic field application parts (magnets) and to increase the number of magnetic samples simultaneously treatable in one magnetic field heat treatment by setting a large gap, in a magnetic circuit for providing a magnetic sample with magnetic anisotropy in the circumferential direction or the radial direction. As a result, the present inventors have reached the present invention.

FIGS. 8A and 8B are explanatory drawings showing structural examples of a magnetic circuit according to the present invention. The magnetic circuit of the present invention is improved from the above magnetic circuits described with reference to FIGS. 7A and 7B. In the basic design concept of the magnetic circuits of FIGS. 7A and 7B, only a side of the magnetic field application part (the pole side of the magnet) is used for applying a magnetic field, whereas in the present invention, magnets having pole faces on magnet gap faces are also used to increase a magnetic field in a gap.

For example, in the magnet circuit for providing magnetic anisotropy in the in-plane radial direction of a soft magnetic under layer 12 formed on a substrate, as shown in FIG. 8A, a magnetic field application part (magnet) 20Aa (having the north pole on the top surface in FIG. 8A) and a magnetic field application part 20Ab (having the south pole on the top surface in FIG. 8A) are respectively provided on the south and north poles of a magnetic field application part (magnet) 20A shown in FIG. 7A.

When magnetic circuits configured thus are stacked in a plurality of stages, a magnetic field (air-gap magnetic field) formed in a gap between the magnetic circuits is superimposed by magnetic fields from the magnets (20Aa and 20Ab) for perpendicular magnetization as well as a magnetic field from the magnet (20A) for horizontal magnetization (in-plane magnetization). The pole faces of the magnets for perpendicular magnetization are disposed closer to the gap between the magnetic circuits, so that a stronger magnetic field can be formed in the gap. Further, since the magnets (20Aa and 20Ab) for perpendicular magnetization are disposed on the north pole and the south pole of the magnet (20A) for horizontal magnetization, the magnetic field superimposing effect is further enhanced as compared with the case where a magnet for perpendicular magnetization is provided on only one of the poles.

In the configuration of the magnetic field application parts (20A, 20Aa and 20Ab) shown in FIG. 8A, the magnetization directions of the magnet 20A and the magnets 20Aa and 20Ab are different from each other by 90°. The magnetization direction may gradually change by an angle of 90° or less.

Moreover, in the magnet circuit for providing magnetic anisotropy in the in-plane circumferential direction of a soft magnetic under layer 12 formed on a substrate, as shown in FIG. 8B, a magnetic field application part (magnet) 20Ba (having the north pole on the top surface in FIG. 8B) and a magnetic field application part 20Bb (having the south pole on the top surface in FIG. 8B) are respectively provided on the south and north poles of a magnetic field application part (magnet) 20B shown in FIG. 7B.

When magnetic circuits configured thus are stacked in a plurality of stages, a magnetic field (air-gap magnetic field) formed in a gap between the magnetic circuits is superimposed by magnetic fields from the magnets (20Ba and 20Bb) for perpendicular magnetization as well as a magnetic field from the magnet (20B) for horizontal magnetization (in-plane magnetization) and the pole faces of the magnets for perpendicular magnetization are disposed closer to the gap between the magnetic circuits, so that a stronger magnetic field can be formed in the gap. Further, since the magnets (20Ba and 20Bb) for perpendicular magnetization are disposed on the north pole and the south pole of the magnet (20B) for horizontal magnetization, the magnetic field superimposing effect is further enhanced as compared with the case where a magnet for perpendicular magnetization is provided on only one of the poles.

In the configuration of the magnetic field application parts (20B, 20Ba and 20Bb) shown in FIG. 8B, the magnetization directions of the magnet 20B and the magnets 20Ba and 20Bb are different from each other by 90°. The magnetization direction may gradually change by an angle of 90° or less.

The magnetic fields generated by the magnetic circuits of FIGS. 8A and 8B cannot be axially symmetrically applied to the object to be treated. Thus at least one of the magnetic circuit and the object to be treated is rotated to have a relative rotational speed, so that an axially symmetric magnetic field is substantially applied to the object to be treated. In FIGS. 8A and 8B, the substrate serving as an object to be treated is rotated.

A magnetic field for providing magnetic anisotropy is applied thus to perform magnetic field heat treatment and thus the substrate is rotated along with the heat treatment. Normally, the magnetic field heat treatment is slowly performed for 5 minutes to several hours. Therefore, when the relative rotational speed is 5 rpm to 500 rpm, an applied magnetic field can be regarded as an axially symmetric magnetic field. Axial symmetry may not be obtained in terms of time average when the relative rotational speed is less than 5 rpm. A rotation mechanism may be complicated when the relative rotational speed exceeds 500 rpm. The lower limit of the relative rotational speed is preferably 10 rpm and the upper limit of the relative rotational speed is preferably 150 rpm.

Since the magnetic circuit of the present invention is provided in a heat treatment furnace, one of the important challenges is to provide the magnetic circuit with thermal resistance. Generally, magnetic field heat treatment is performed at 150° C. to 300° C. and thus the magnetic circuit should not be thermally demagnetized in this temperature range.

When a NdFeB sintered magnet is used as the magnetic application part to provide the magnetic circuit of the present invention with heat resistance, it is preferable that the magnet has a coercive force of at least 20 kilooersteds (kOe). A coercive force of 30 kilooersteds (kOe) or larger is more preferable.

On the other hand, when a 2-17 type SmCo magnet is used, it is preferable to have a coercive force of at least 10 kOe. A coercive force of 20 kOe or larger is more preferable. The 2-17 type SmCo magnet has lower saturation magnetization than the NdFeB magnet but the reversible temperature coefficient of the coercive force is about one third that of the NdFeB magnet. Thus the 2-17 type SmCo magnet is suitable for magnetic field heat treatment at 200° C. or higher.

The magnetic circuit of the present invention can be also used at a temperature below 150° C. Assuming that the magnetic circuit is used at high temperatures of 150° C. or higher, it is not preferable to use an adhesive when fixing the magnets. Even with a heat-resistant epoxy adhesive, it is difficult to keep the original adhesion over the long term at high temperatures exceeding 150° C. Further, volatile gas generated from an adhesive may adversely affect an untreated sample at high temperatures. Therefore, the way the magnets are fixed is important.

A rare-earth permanent magnet has an intermetallic compound as a main phase, is highly brittle, and is hard to be tapped. Thus a rare-earth permanent magnet cannot be substantially screwed and is preferably fixed in a mechanical manner. "Fixed in a mechanical manner" means that in the permanent magnet magnetic circuit made up of two or more rare-earth permanent magnets, the spacing of the sides of the magnets and the positional relationship between the magnetization directions are kept without using an adhesive or directly using a screw.

To be specific, effective methods include a method of forming a step on a part of a magnet to apply a pressure and a method of forming a tapered portion (regardless of a non-magnetic material and a magnetic material) on a magnet and fixing the tapered portion on a support plate via a non-magnetic bolt.

Although a magnetic surface may be bare, it is more desirable to apply a metallic coating on the magnetic surface. Since a rare-earth magnet is generally brittle, an external force directly applied to a surface of the rare-earth magnet may cause a crack or a chip. In order to prevent a crack and a chip, it is effective to apply a coating of a ductile metal according to a technique such as Ni plating and Al ion plating.

The shape of the magnet used for the magnetic circuit is not limited to a specific shape. It is preferable that the shape of the magnet allows the magnetic circuit of a single stage to be configured as a ring-shaped magnetic circuit and allows the single-stage magnetic circuits to be stacked in at least two stages with gaps formed between the magnetic circuits. A Halbach configuration is preferable in which a magnetic field can be generated in the in-plane radial direction or the in-plane circumferential direction by the magnetization directions of magnetic field application parts (magnets) provided on each magnetic circuit of a single stage.

Particularly in the case of a magnetic circuit for in-plane circumferential magnetization, it is preferable to dispose magnets so as to rotate and change the magnetization direction by 90° at a time. Although the thickness of the magnet is not particularly limited, it is preferable to include a segment magnet treated to have a thickness of 5 mm to 100 mm.

Figure 9A:
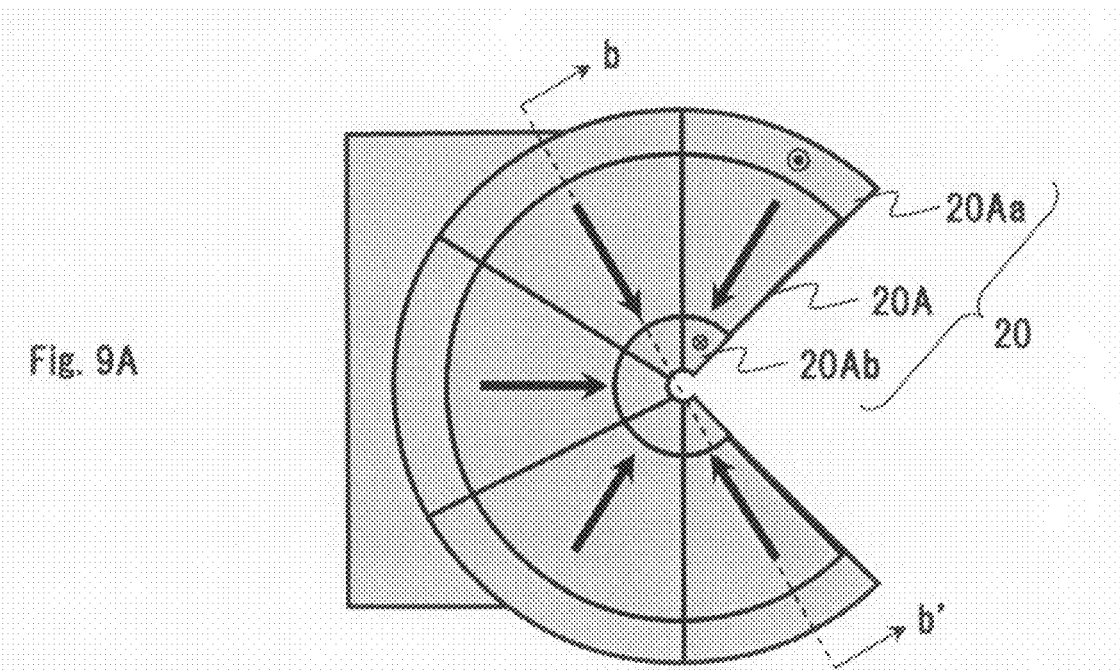
FIGS. 9A and 9B are explanatory drawings showing a first structural example of a magnetic circuit according to the present invention in which magnetic anisotropy is provided in the in-plane radial direction of a soft magnetic under layer formed on a substrate.
Figure 9B:
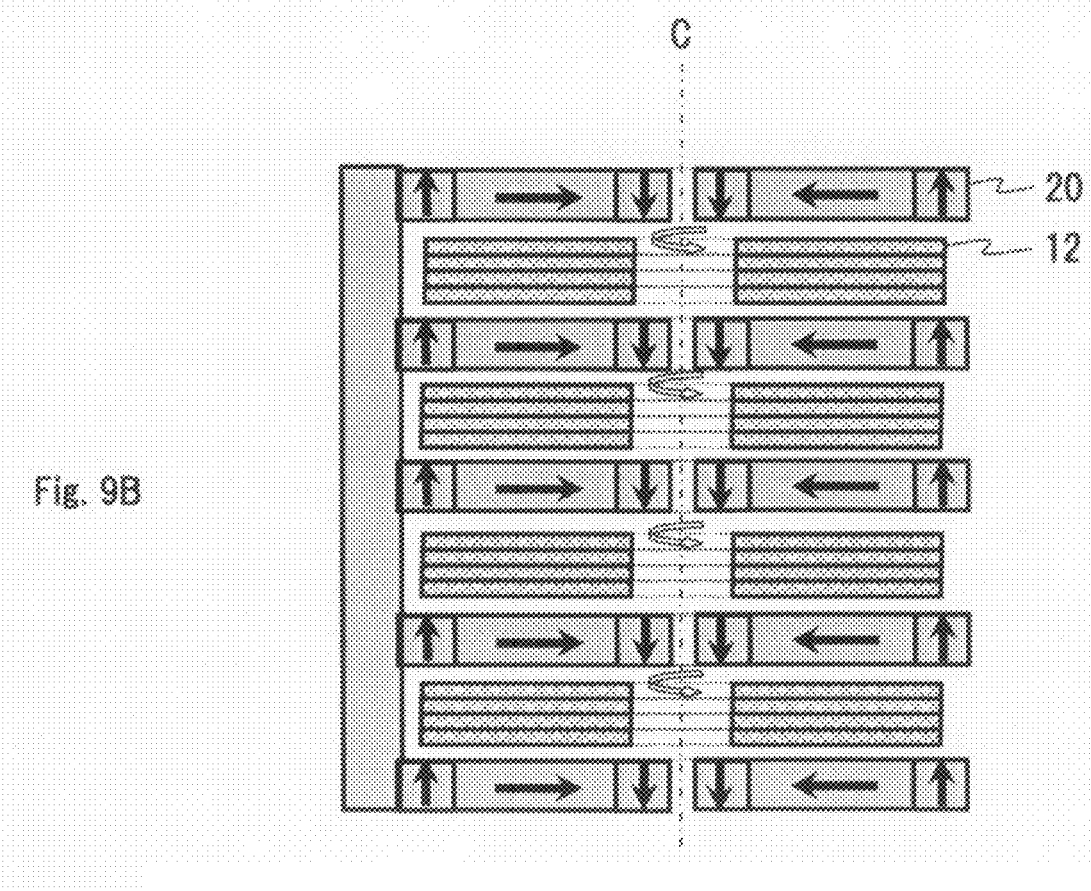

FIGS. 9A and 9B are explanatory drawings showing a first structural example of the magnetic circuit according to the present invention. In this magnetic circuit, the magnetization directions of magnets are selected to provide magnetic anisotropy in the in-plane radial direction of a soft magnetic under layer formed on a substrate. FIG. 9A is a top view of the magnetic circuit and FIG. 9B is a sectional view taken along line b-b' of FIG. 9A.

The magnetic circuit of a single stage is configured by combining a plurality of (five in FIG. 8A) magnetic field application parts 20, each including the three magnets (the magnet (20A) for horizontal magnetization and the magnets (20Aa and 20Ab) for perpendicular magnetization) described with reference to FIG. 8A. The single-stage magnetic circuits are stacked in five stages, a plurality of substrates having soft magnetic under layers 12 formed thereon are set in a gap formed between the stages, and magnetic fields are applied to the substrates.

The virtual center of the magnetic circuit and the axis of the substrate are substantially aligned with each other. The substrate can be rotated about an axis (C) of the substrate by a rotation mechanism (not shown) and a magnetic field is applied over the soft magnetic under layer by the rotation.

FIGS. 9A and 9B illustrate the magnets for generating magnetic fields in the radial direction of the soft magnetic under layer. When a magnetic field is applied using a magnet for generating a magnetic field in the circumferential direction of the soft magnetic under layer, magnetic anisotropy is provided for a magnetization curve of the circumferential direction in the plane of the soft magnetic under layer.

Figure 10A:
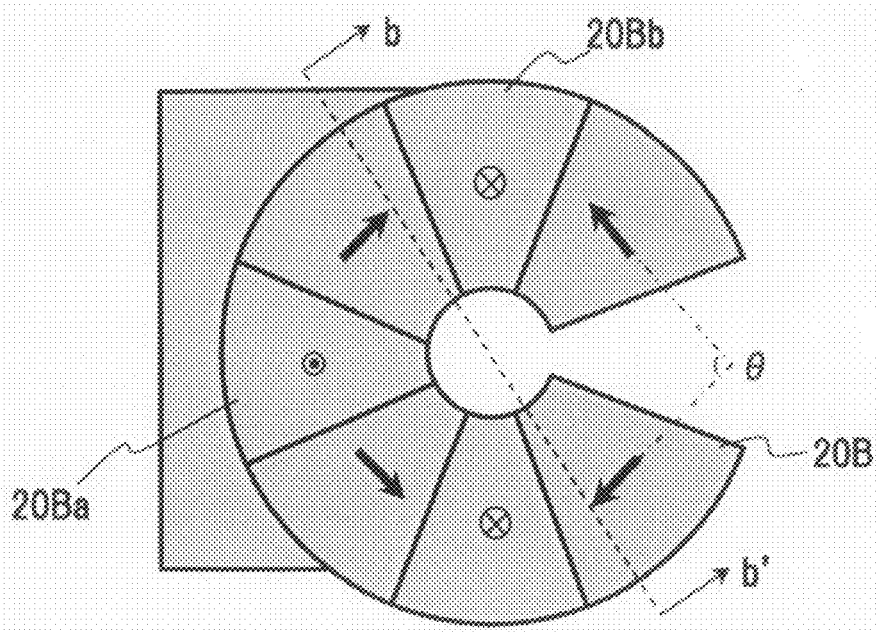
FIGS. 10A and 10B are explanatory drawings showing a second structural example of the magnetic circuit according to the present invention in which magnetic anisotropy is provided in the in-plane circumferential direction of a soft magnetic under layer formed on a substrate.
Figure 10B:
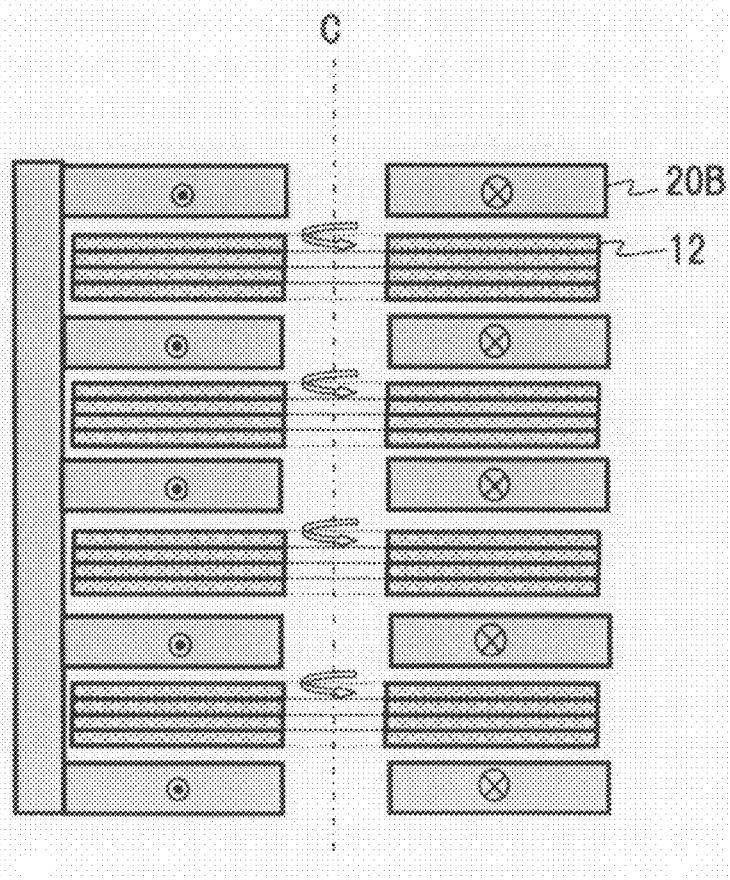

FIGS. 10A and 10B show a structural example of the magnetic circuit in which the magnetization directions of magnets are selected to provide magnetic anisotropy in the in-plane circumferential direction of a soft magnetic under layer formed on a substrate. FIG. 10A is a top view of the magnetic circuit and FIG. 10B is a sectional view taken along line b-b' of FIG. 10A.

In the magnetic circuit of FIGS. 10A and 10B, the magnets are disposed such that the magnetization direction rotates and changes by 90° at a time. In this case, the magnetic field direction periodically changes along the in-plane circumferential direction of the substrate. Even if the magnetic field direction changes by 180°, the direction of the magnetic anisotropy of the soft magnetic under layer (SUL film) is not affected as long as the angle of the magnetic field does not change. Thus no problems occur.

In both of the magnetic circuits of FIGS. 9A and 9B and FIGS. 10A and 10B, the gap between the magnets is set at about 30 mm to 200 mm, preferably at 50 mm to 100 mm. Further, In both of the magnetic circuits of FIGS. 9A and 9B and FIGS. 10A and 10B, a "notched portion" is formed by removing a part of the magnets combined like a ring. Such a "notched portion" makes it possible to insert a supporting rod into the central hole of the substrate to be treated and set the supporting rod in alignment with the virtual axis of the magnetic circuit, thereby improving workability.

The magnetic circuit of the present invention is used in, for example, a fabrication process of a perpendicular magnetic recording medium. A suitable object to be treated includes a soft magnetic under layer provided on a substrate. As described above, a material of the substrate includes, for example, a Si single crystal, a crystal tempered glass, an amorphous tempered glass, and aluminum. A soft magnetic material contained in the soft magnetic under layer includes, for example, at least one material selected from Ni, Co and Fe. Normally, the soft magnetic material contained in the soft magnetic under layer has a coercive force of 20 Oe or less, preferably 0.1 Oe to 10 Oe.

The soft magnetic under layer may be formed according to either the dry process such as a sputtering method or the wet process such as a plating method. The soft magnetic under layer is preferably 10 nm to 1000 nm in thickness. The lower limit of the thickness is preferably 50 nm and the upper limit of the thickness is preferably 500 nm.

Example

Magnetic circuits configured as shown in FIGS. 9A and 9B or FIGS. 10A and 10B were produced using a 2-17 type SmCo magnet of $H_{cj}$=25 kOe at $B_r$=11 kG and a Nd2Fe14B magnet of $H_{cj}$=30 kOe at $B_r$=12.5 kG. The magnetic field application surfaces of these magnetic circuits were each configured by combining a plurality of sets of magnets (the magnets 20 in FIGS. 9A and 9B and the magnets 20B, 20Ba and 20Bb in FIGS. 10A and 10B).

Further, in order to prevent chips, electric nickel plating (about 10 μm in thickness) was performed on the surfaces of the magnets 20. The magnets 20 were 15 mm to 25 mm in thickness and a gap between the magnet surfaces was 50 mm to 100 mm. Moreover, the magnets were fixed and prevented from coming out of the circuit by tapering the magnets. The five magnetic application surfaces were stacked with four gaps.

Table 1 shows the measurement results of magnetic field strengths having been measured at the center of the gap by a gauss meter and shows the demagnetizing factors of the magnetic circuits after the magnetic circuits were heat-treated at high temperatures of 160° C. to 300° C. (kept for one hour).

TABLE 1

| No | Rare-earth Magnet | Magnet Thickness mm | Gap mm | Magnetic Field Strength kOe | Magnetic Field Direction | Exposure Temperature ° C. | Demagnetizing Factor % |
|---|---|---|---|---|---|---|---|
| 1 | NdFeB | 15 | 50 | 1.45 | Circumferential Direction | 160 | 1.8 |
| 2 | NdFeB | 20 | 70 | 0.98 | Radial Direction | 180 | 1.2 |
| 3 | 2-17SmCo | 15 | 50 | 1.20 | Radial Direction | 200 | 0.40 |
| 4 | 2-17SmCo | 15 | 50 | 1.25 | Circumferential Direction | 230 | 0.85 |
| 5 | 2-17SmCo | 20 | 70 | 1.10 | Circumferential Direction | 250 | 1.0 |
| 6 | 2-17SmCo | 30 | 100 | 0.75 | Radial Direction | 300 | 1.50 |

In all of the magnetic circuits, no large demagnetizing factors were not found after the high-temperature heat treatment. Moreover, in all of samples 1 to 6, each having a gap of 50 mm or larger, an air-gap magnetic field of 500 G or more was obtained.

A magnetic field was applied to a soft magnetic under layer by using these magnetic circuits. The soft magnetic under layer was provided for perpendicular magnetic recording and was obtained by sequentially plating a Ni film and a CoNiFeB film on a Si single crystal (100) (P-doped n-type substrate) having a diameter of 65 mm. The coercive force of the soft magnetic under layer was 3.00 Oe, which was a preferable soft magnetic property.

The substrates including the soft magnetic under layers were respectively stored in the gaps between the magnetic circuits shown in Table 1, the axes of the substrates and the magnetic circuits were aligned with each other, and the substrates were subjected to magnetic field heat treatment in Ar inert gas for one hour while being rotated at 80 rpm. The heat treatment temperatures are shown in Table 1.

After the samples were cooled, the magnetic properties of the soft magnetic under layers were measured. As a result, it was confirmed that magnetic anisotropy of about 15 Oe to 250 Oe was provided over the substrates in the in-plane radial direction or the in-plane circumferential direction according to the directions of the applied magnetic fields. Further, the magnetic anisotropy and symmetry around the axes of the substrates were preferable. Therefore, it was confirmed that even when a large gap was set between the magnets, an axially symmetric magnetic field was applied and the soft magnetic under layers could be provided with sufficiently practical magnetic anisotropy in the magnetic circuits of the present invention.

According to the present invention, it is possible to provide a magnetic circuit making to possible to effectively perform magnetic field heat treatment on magnetic samples. Particularly, a permanent magnet magnetic circuit is provided which is suitable for providing a soft magnetic substance (particularly, a soft magnetic under layer (SUL film) for a perpendicular two-layer magnetic recording medium) with axially symmetric magnetic anisotropy through magnetic field heat treatment and is capable of generating a strong magnetic field.

What is claimed is:

1. A magnetic circuit for storing a magnetic recording medium in a gap formed between a plurality of magnetic field application parts opposed to each other in parallel and applying a magnetic field to the magnetic recording medium,
    wherein each of the magnetic field application parts is configured by combining a plurality of permanent magnet segments,
    the permanent magnet segments include a first permanent magnet horizontally magnetized in parallel with an opposed surface of the magnet field application part,
    a second permanent magnet magnetized perpendicularly to the opposed surface of the magnetic field application part, the second permanent magnet being provided on a north pole of the first permanent magnet,
    a third permanent magnet perpendicularly magnetized in an opposite direction from the second permanent magnet, the third permanent magnet being provided on a south pole of the first permanent magnets, and
    wherein the magnetic field application parts are configured like a ring around a virtual axis with a combination of the plurality of first to third permanent magnets, the first permanent magnet is disposed such that the first permanent magnet is magnetized along a direction transverse to the virtual axis, and
    the first permanent magnet is longer than the second permanent magnet and the third permanent magnet in a direction transverse to the virtual axis.

2. The magnetic circuit according to claim 1, wherein the magnet is a 2-17 type SmCo magnet having a coercive force of at least 20 kOe and the gap is 50 mm to 100 mm.

3. A magnetic circuit, for heat treatment of a magnetic recording medium comprising:
    a plurality of magnetic field application parts stacked in an axial direction with a gap between each adjacent magnetic field application parts, wherein the magnetic recording medium is positioned in the gap, the magnetic field application parts positioned at least partially around a central axis of the magnetic circuit extending in the axial direction, each magnetic field application part including,
        a first permanent magnet magnetized in a first direction, the first direction being a radial direction with respect to the central axis,
        a second permanent magnet positioned on a north pole of the first permanent magnet, the second permanent magnet being magnetized in a second direction, the second direction being a direction aligned with the central axis, and
        a third permanent magnet positioned on a south pole of the first permanent magnet, the third permanent magnet being magnetized in a third direction, the third direction being opposite to the second direction,
            wherein, the first direction, the second direction, and the third direction of all magnetic field application parts in the plurality are the same.

4. The magnetic circuit according to claim 3, wherein the gap between each adjacent magnetic field application parts is between 50 mm and 100 mm.

* * * * *